United States Patent
Movsisyan

(10) Patent No.: US 10,462,030 B2
(45) Date of Patent: Oct. 29, 2019

(54) METHOD AND SYSTEM FOR MANAGING NETWORK NODES THAT IMPLEMENT A LOGICAL MULTI-NODE APPLICATION

(71) Applicant: NICIRA, INC., Palo Alto, CA (US)

(72) Inventor: Vardan Movsisyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 7 days.

(21) Appl. No.: 15/287,799

(22) Filed: Oct. 7, 2016

(65) Prior Publication Data

US 2018/0102943 A1 Apr. 12, 2018

(51) Int. Cl.
*H04L 12/26* (2006.01)
*H04L 12/24* (2006.01)

(52) U.S. Cl.
CPC ........ *H04L 43/0876* (2013.01); *H04L 41/069* (2013.01); *H04L 41/14* (2013.01); *H04L 43/0817* (2013.01)

(58) Field of Classification Search
CPC ............... H04L 41/5003; H04L 41/509; H04L 43/0876; H04L 45/48; H04L 45/50; H04L 45/66; H04L 45/74; H04L 47/00; H04L 47/10; H04L 47/22; H04L 49/3036; H04L 49/351; H04L 5/14; H04L 61/15; H04L 61/20; H04L 63/0218; H04L 63/0236; H04L 63/0263; H04L 63/0272; H04L 41/12; H04L 67/10; H04L 41/22; H04L 43/0817; H04L 45/02; H04L 45/38; H04L 41/0668; H04L 41/145; H04L 41/147; H04L 45/04; H04L 45/12; H04L 45/28; H04L 63/1416; H04L 67/1097; H04L 67/306; H04L 41/0681; H04L 41/069; H04L 43/16; G06F 11/0709; G06F 11/0784; G06F 11/0787; G06F 2009/4557; G06F 21/33; G06F 9/45558; G06F 11/076; G06F 11/0766; G06F 11/0778; G06F 11/0781; G06F 11/079; G06F 11/0793;
(Continued)

(56) References Cited

U.S. PATENT DOCUMENTS 7,194,723 B1 3/2007 Hwang et al.
9,684,369 B2 6/2017 Huang et al.
(Continued)

OTHER PUBLICATIONS

"Create a Service Blueprint" pp. 1-2.
(Continued)

*Primary Examiner* — Djenane M Bayard

(57) ABSTRACT

Some embodiments of the invention provide a novel method of managing network nodes that implement a logical multi-node application. The method can comprise obtaining log data describing events relating to a plurality of network nodes and obtaining network flow data describing flow of data between the plurality of network nodes. The method may identify roles performed by the network nodes. The method may detect relationships between the network nodes. The identified roles and the detected relationships are analyzed to identify which of the network nodes implement a logical multi-node application. Implementation data based on the identification of which of the network nodes implement the logical multi-node application can be processed to automatically control management of at least one of the network nodes.

20 Claims, 6 Drawing Sheets

(58) Field of Classification Search
CPC ............ G06F 11/3006; G06F 11/3034; G06F 11/3072; G06F 11/327; G06F 11/3476; G06F 11/3495; G06F 16/24532; G06F 16/9027; G06F 2009/45595; G06F 21/50; G06F 21/552; G06F 8/38; G06F 9/451; G06F 9/455; G06F 9/5083
See application file for complete search history.

(56) References Cited

U.S. PATENT DOCUMENTS

| | | | |
|---|---|---|---|
| 9,727,363 B2 | 8/2017 | Wang | |
| 2009/0313311 A1* | 12/2009 | Hoffmann | G06F 11/2094 |
| 2014/0222745 A1* | 8/2014 | Deng | G06N 7/005 |
| | | | 706/47 |
| 2016/0092252 A1 | 3/2016 | Wagner | |
| 2016/0103699 A1* | 4/2016 | Thakkar | G06F 9/45558 |
| | | | 718/1 |
| 2016/0246636 A1 | 8/2016 | Tsirkin | |
| 2016/0277299 A1* | 9/2016 | Kadaba | H04L 12/56 |
| 2017/0185563 A1* | 6/2017 | Underwood | G06F 15/17331 |

OTHER PUBLICATIONS

"VMware vRealize Log Insight" Automated Log Management for Hybrid Cloud Environments, pp. 1-2.

"VMware vRealize Operations" Intelligent Operations from Applications to Storage—from vSphere and Hyper-V to Amazon Web Services and Physical Hardware, pp. 1-2.

"VMware vRealize Network Insight" Intelligent operations for networking and security for physical, virtual and cloud environments, pp. 1-2.

* cited by examiner

METHOD AND SYSTEM FOR MANAGING NETWORK NODES THAT IMPLEMENT A LOGICAL MULTI-NODE APPLICATION

BACKGROUND

Logical multi-node applications are implemented using two or more network nodes and can provide a wide variety of services, such as different web applications, back office, document management, communications, etc. Logical applications can range from simple websites that use only a few nodes to more complex structures in terms of both scale and depth, such as Gmail™, which can use hundreds of thousands of different nodes.

Efficient monitoring and management of an environment hosting logical applications requires dynamically understanding its logical structure; for example, identifying which network nodes/objects are part of the same logical application/service, and what roles they have within the logical application. For data centres that host complex logical applications this can be an extremely challenging task because components of a single logical application may be executed across tens of thousands of servers.

Configuration drift is also common problem in data centers due to the high number, and frequency, of hardware and software configuration changes. Configuration drift makes it difficult to accurately monitor which nodes are responsible for actually implementing a logical application. It is therefore challenging to automatically perform management operations, such as monitoring, optimizing and/or troubleshooting, multi-node networked applications because such tasks rely on correctly identifying the logical applications and their components. Accurately tracking the nodes that implement logical applications can offer management advantages, such as improving data routing and resource management (e.g. allocating resources having CPU/memory requirements that are particularly suitable for a database server or a web server component of a logical application).

VMware's vRealize Automation (vRA) Service Blueprint is a concept that can be used to define which nodes should implement which logical applications. However, it is not designed to deal with dynamically changing configurations or pre-existing environments.

SUMMARY

Some embodiments of the invention provide a computer-implemented method of managing at least one node in a network that implements a logical application. The method can obtain log data describing events relating to a plurality of network nodes and obtain network flow data describing flow of data between the plurality of network nodes. The method may analyze the log data to identify at least one role performed by at least one of the plurality of network nodes. The method may analyze the network flow data to detect at least one relationship between at least some of the plurality of network nodes. The method may analyze the at least one identified role and the at least one detected relationship to identify which of the network nodes implement a logical multi-node application. The method may process implementation data based on the identification of which of the network nodes implement the logical multi-node application to automatically control management of at least one of the network nodes.

Some embodiments can group events relating to different network nodes into event types, and a role can comprise a distinct set of these event types. Some embodiments may identify which of the network nodes implement logical components of the logical multi-node application. The method may detect at least one relationship between the network nodes. The detecting of a relationship may be based on correlations between properties (e.g. resource usage, data flow, etc.) of the network nodes. Alternatively or additionally, the detecting of a relationship may be based on exclusiveness of data flow between some of the network nodes.

Some embodiments may pre-filter some of the network nodes so that data relating to such nodes are not obtained and/or analyzed.

Some embodiments provide a non-transitory machine readable medium storing a program which when executed by at least one processing unit identifies network nodes that implement a logical multi-node application, the program comprising sets of instructions for executing methods substantially as described herein.

Some embodiments provide a system configured to identify network nodes that implement a logical multi-node application, the system comprising one or more processing units executing sets of instructions substantially as described herein.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments analyze visible network characteristics in order to identify which nodes implement a logical application. The types of visible network characteristics analyzed are mainly based on log data and network flow information, but can include other types of information, such as resource/inventory. Embodiments can be applied to virtual or physical network nodes.

Embodiments can be particularly advantageous because they can deal with dynamic configuration changes and are not dependent upon accessing or updating static configuration information, such as vRA Blueprints.

Figure 1:
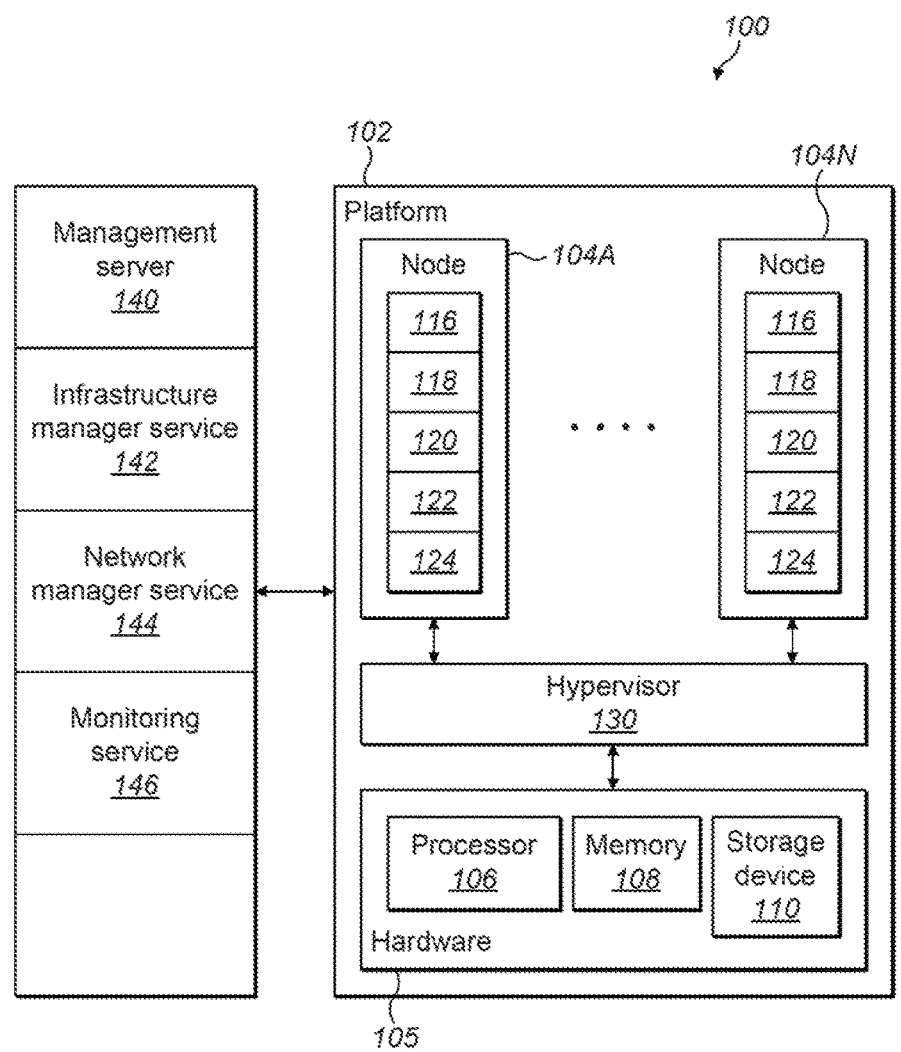
FIG. 1 is a block diagram illustrating components of an example embodiment based on a virtualization infrastructure.

FIG. 1 is a schematic block diagram illustrating components of an example embodiment. The example embodiment of FIG. 1 is based on a virtualization infrastructure 100 configured to support virtual machines (VMs). The various computational and administrative modules shown in FIG. 1 can comprise computer-executable instructions that may be provided, stored, loaded and executed from any known computer-readable storage medium, including downloading the code over a network into memory or other storage units, on physical media such as CD-ROM or other disks, on optical or magnetic storage media, on flash or other RAM-based memory devices, etc. It will be understood that alternative embodiments can be based on non-virtualized environments.

As generally understood in the field of datacentre administration, a VM is a software abstraction of a physical computer system. In some embodiments the virtualization infrastructure 100 can include at least one host hardware platform 102 that supports a set of nodes 104A-104N that are configured as network objects in the form of VMs 104A-104N with supporting and supervisory hardware and software modules. In other embodiments the network nodes/objects can comprise Virtual Computing Instances (VCIs), such as Virtual Containers (VCs), etc, rather than, or in addition to, VMs. Additionally or alternatively, in some embodiments the network nodes/objects can comprise physical servers, physical storage devices, objects implementing network functions (e.g. routing, firewalling, Network Address Translation), etc.

In the example embodiment of FIG. 1 the host platform comprises hardware 105 that typically includes at least one processor 106, internal memory 108 and storage device 110, such as a disk. Each of the nodes/VMs 104 will typically include at least one virtual processor 116, virtual system memory 118, a virtual disk 120 and a guest operating system 122. Applications 124, which may be components of logical multi-node applications, running within the nodes/VMs will act essentially the same as they would if run directly on a physical computer instead of a VM. Executable files will be accessed by the guest OS from the virtual disk or virtual memory.

Virtualization software including a hypervisor 130 can provide an interface between each of the nodes/VMs 104 and the underlying host platform hardware 105. The infrastructure 100 can further include management server 140, such as VMware vCenter Server, that functions as a centralized initiating and supervisory system for provisioning and managing the overall virtual infrastructure.

The example embodiment of FIG. 1 can include an infrastructure manager service 142 configured to provide resource/inventory information regarding the nodes 104. In some embodiments the infrastructure manager service may comprise a data center management server application that can provide centralized management and operation, resource provisioning and performance evaluation of virtual machines residing on the nodes. An example of the infrastructure manager service 142 can comprise at least one (virtual or non-virtual) computing device, or possibly a software application or module running on the management server 140.

Some embodiments can include a network manager service 144. This can provide information regarding network usage and traffic in relation to at least some of the nodes 104. An example of the network manager service 144 for a virtualized network can comprise at least one (virtual or non-virtual) computing device executing NSX by VMware. NSX is a software defined networking (SDN) system that abstracts network operations from the underlying hardware onto a distributed virtualization layer. SDN systems can provide logical network isolation between logically defined networks on which the nodes 104 reside, and implement distributed logical firewalls, switches, routers, ports and other networking elements. It can also support external networking and security ecosystem services.

Some embodiments can include a monitoring service 146. The monitoring service can analyze log data from at least some of the nodes 104, which act as log data sources. The log data may be provided in textual format. One example of the monitoring service 146 can comprise at least one (virtual or non-virtual) computing device, possibly part of the management server 140, executing log data service software, such as vRealize Log Insight by VMware, which can manage and analyze log data. Another example of the monitoring service component could be VMware Network Insight, which delivers intelligent operations for software-defined networking & security.

It will be understood that some embodiments can include alternative/additional services. For example, in some embodiments the monitoring service 146 may include a metrics analytics service component that analyzes configuration, CPU/memory/storage/network properties and usage, VCI properties and state, computed metrics, etc, received from at least some of the nodes 104. Such metrics data will typically be provided in a more structured way, such as key-value pairs. One example of a suitable metrics analytics service can comprise at least one (virtual or non-virtual) computing device executing VMware vRealize Operations.

In general, each of the nodes 104 will be visible as a separate entity/object in the network to the infrastructure manager service 142 and/or the network manager service 144, and/or can comprise a separate data source entity for the monitoring service 146.

It will be appreciated that the illustrated embodiment is exemplary only and is based on a virtualized environment. Alternative embodiments may at least partially include non-virtualized components.

Figure 2:
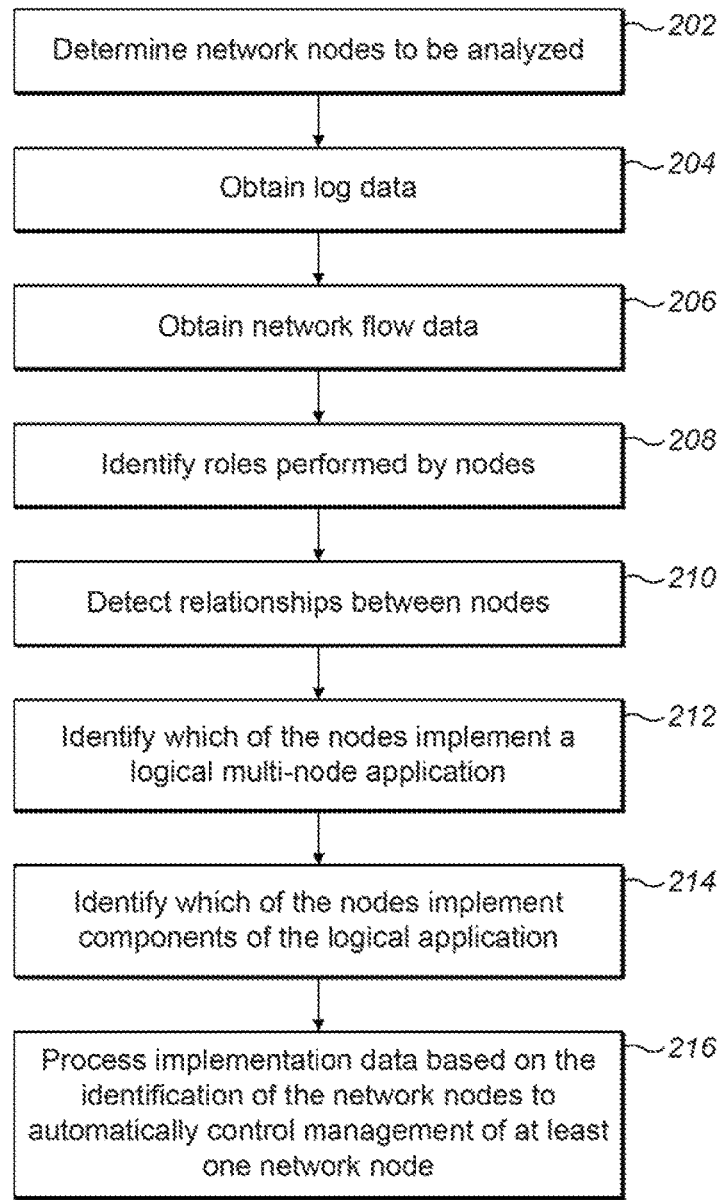
FIG. 2 is a flowchart illustrating steps performed by the example embodiment.

FIG. 2 is a flowchart illustrating steps performed by some embodiments of the invention. The steps may be performed by one or more of the services 142-146 and/or by any other computing device(s), or VM(s), in communication with those services, e.g. via any suitable communications interface(s). It will be appreciated that the steps shown in the flowcharts herein are exemplary only and in alternative embodiments some of the steps may be re-ordered and/or omitted. Further, additional steps (not shown in the flowcharts) may also be performed.

At step 202 of FIG. 2 some embodiments can determine which of the nodes 104 in the network are to be analyzed. This step can include selecting nodes having characteristics that can be analyzed by, or are visible to, the infrastructure manager service 142 and/or the network manager service 144 and/or the monitoring service 146. For example, nodes that have acted as log/metric data sources for the monitoring service 146, typically active nodes that have provided monitoring data to the monitoring service 146 within a recent timeframe (e.g. within the last 10 minutes or the last week), will be analyzed. Other examples include nodes that are actively managed by the network manager service 144, and/or nodes that are controlled by the infrastructure manager service 142.

The step 202 may exclude transient nodes from further analysis by the example embodiment. For example, nodes that have a connection volume and/or connection frequency below a predetermined or dynamically-calculated threshold(s). Other examples of excluded nodes can comprise nodes that are known to be part of the virtualization infrastructure, such as VM hosts, which cannot belong to web-service nodes/logical applications.

Only data relating to the nodes selected (and not excluded) by the step 202 will normally be processed at subsequent steps 204 onwards. Thus, the step 202 effectively filters out nodes that are unlikely to implement logical applications (at least to a significant extent), thereby improving the computational efficiency of embodiments and may reinforce/correct results produced by possible previous iterations of the method.

At step 204 some embodiments can obtain log data, typically from the monitoring service 146. The type of information typically included in the log data will describe events relating to the network nodes. Events can relate to hardware and/or software associated with the node and examples include inputs/outputs, user actions, success/failure, errors, etc. In some embodiments a log entry for an event can comprise a Timestamp (indicating when the event occurred); Source (indicating where the event came from); Text (raw text of the event) and Field(s) (a name-value pair extracted from the event), e.g. source IP of a connecting client; login name of a user of the application; name of relevant user-action; result of the action (success, fail, etc). In some embodiments, the step 204 may include obtaining metrics data from the metrics analytics service.

At step 206 some embodiments can obtain network flow data, typically from the network manager service 144 and/or monitoring service 146. The type of information typically included in the network flow data can describe an amount of incoming/outgoing traffic (e.g. in bytes) per node or service over a specified time period; netflow patterns such as silence duration between initial/closing and subsequent sized requests (these may be granularized to request-reply); source and destination ports; NAT (Network Address Translation) and routing details.

The log data obtained at the step 204 and the network flow data obtained at the step 206 may relate to different network nodes, although there will normally be at least some overlap. Some embodiments may also use data obtained from other sources, e.g. from the infrastructure manager service 142 and/or a metrics analytics service. In some embodiments, the method continuously (or at very short intervals) obtains and processes the data from the various sources, thereby providing substantially real-time analysis of the network nodes and infrastructure.

At step 208 some embodiments can identify a role performed by at least one of the nodes 104. A role can comprise the aggregate of the functionality provided by a network node in the context of the logical multi-node application that it implements. Typical examples of roles that can be performed by the nodes that implement a logical multi-node application include: specific application server, web-server, database-server, email-server, caching/proxy server, DNS (Domain Name System) server, combination of such services, etc. It will be understood that herein a "server" can comprise a virtual or physical server.

Figure 3:
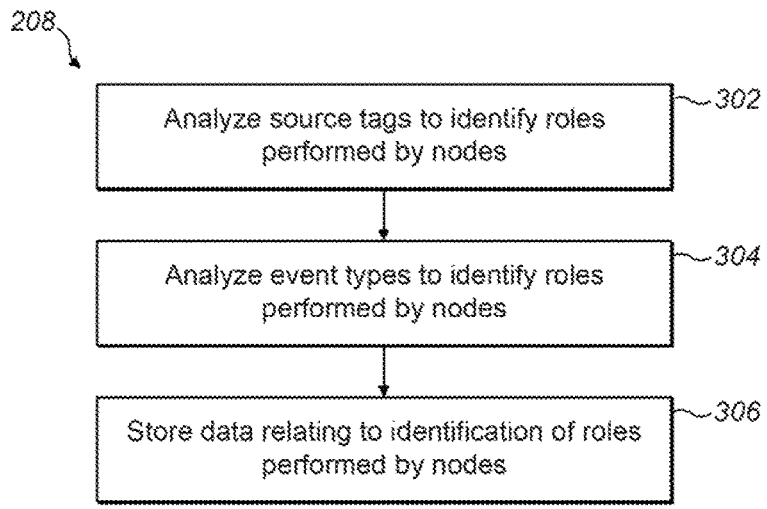
FIG. 3 is a flowchart illustrating operations that can be performed at a node role identification step of the example embodiment.

FIG. 3 schematically illustrates operations that can be performed by some embodiments at the step 208 using the log data obtained at the step 204.

At step 302 some embodiments use log source tags to identify the more statically-defined role(s) performed by the node(s). For instance, where the monitoring service 146 comprises vRealize Log Insight or similar service, an explicit log source tag might be provided by an agent (such as {'prod':'webserver'} in the tag field of a [filelog] configuration section of a configuration file), which can be extracted and used to group together, e.g. all the nodes performing a "web-server" role. Similarly, log source tags can be used to group together all the nodes performing a "database-server role", etc. Some embodiments may utilize alternative/additional information source(s) in order to determine the role(s) performed by the node(s). For example, embodiments may perform packet header or deep packet inspection in order to identify roles, e.g., detecting that a node is receiving traffic with a particular TCP destination port can be used to identify/reinforce identification of a role performed by that node.

At step 304 some embodiments may identify the role(s) performed by the node(s) based on event types. Similar events (typically events that are identical except for a few variables, e.g. hostname, a particular value, etc.) can be grouped together as an event type. In general, for determining event types, dynamic parts of an event log will be ignored and only the static parts analyzed. In embodiments that use vRealize Log Insight or similar service as the monitoring service 146, similar events can be grouped in "event_types" using machine learning techniques.

An example of how event types can be determined based on event log data is given below:

Log source 1:
$timestamp $hostname httpd started on $time1 as $website1
$timestamp $hostname httpd stopped on $time2 as $website1

Log source 2:
$timestamp $hostname httpd started on $time3 as Swebsite2
$timestamp $hostname httpd stopped on $time4 as $website2

For the above example (where variables begin with $ sign), two event types can be determined:
"httpd started on as"->recognized by Log Insight as event-type-1
"httpd stopped on as"->recognized by Log Insight as event-type-2

In embodiments that use VMware's Log Insight, "httpd" from the above example could be specified as "app-name" corresponding to syslog Request For Comments (RFC)5424.

Some embodiments can identify a role performed by a node based on a distinct set of event types. For example, if an embodiment detects at the step 304 that: a first server node "srv1" is sending event types 1 & 2; a second server node "srv2" is sending event types 3 & 4, and a third server node "srv3" is sending event types 1 & 2, then it may determine that the first server node "srv1" and the third server node "srv3" perform the same role (based on the distinct set of event types 1 & 2).

The identification of a role performed by a node can optionally be based on other correction/refinement steps, such as taking into account which applications are generating relevant event types based on the "app-name" construct from the syslog RFC, etc. For instance, a "httpd started on as" message from app-name="httpd" would be treated as not being related to a different application from a message having the same static message part containing an event type from app-name="some-virus".

At step 306, electronic data representing the role(s) performed by the node(s) as identified at the steps 302-304 is stored for further automatic processing.

Returning to FIG. 2, at step 210 some embodiments can detect at least one relationship between at least some of the network nodes 104. In some embodiments the relationship(s) may be detected based on analyzing network data flow, typically using data provided by the network manager service 144. Some embodiments may detect at least one relationship based on detecting at least one correlation between at least one property (such as resource usage and/or data flow) of the nodes. Additionally or alternatively, some embodiments may detect at least one relationship based on detecting exclusiveness of network data flow/transfer between some of the nodes.

In some embodiments, information regarding the roles performed by the nodes as identified at the step 208 may also be used to detect the at least one relationship. For instance, some embodiments may group subsets of the nodes that were identified as performing different roles at the step 208 in order to help with the identification of which of the nodes implement a logical application. Some embodiments may further use data obtained from other sources, e.g. from the infrastructure manager service 142, a metrics service, etc., to detect relationships between the nodes.

Figure 4:
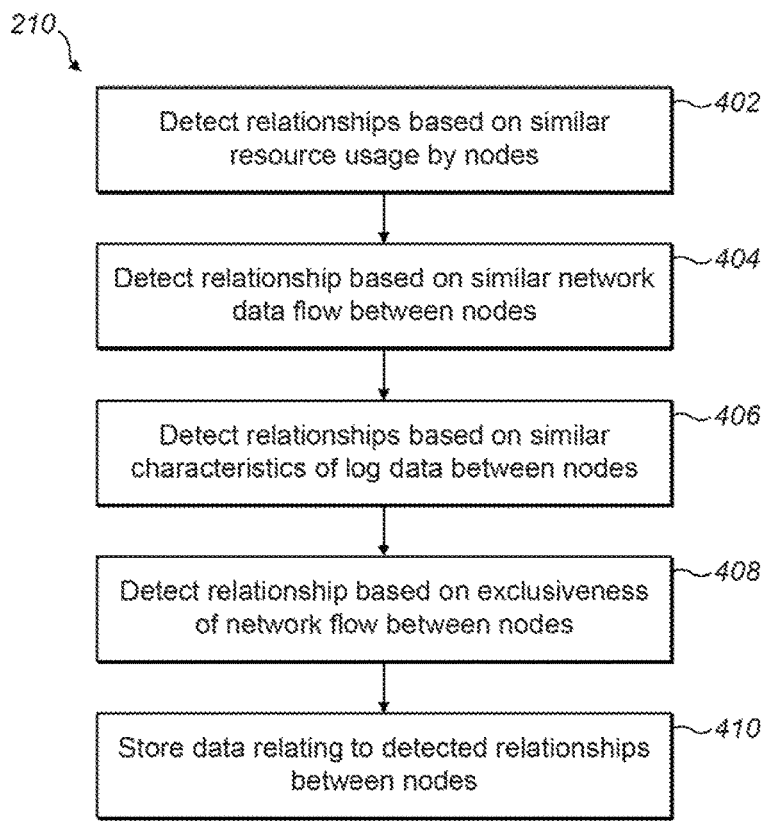
FIG. 4 is a flowchart illustrating operations that can be performed at a node relationship detection step of the example embodiment.

FIG. 4 schematically illustrates operations that can be performed by some embodiments at the step 210 using at least the network flow data obtained at the step 206.

At step 402, some embodiments can detect at least one correlation between the nodes that were identified at the step 208 as performing different roles. For brevity, detecting relationships/correlations between a first node that performs a first role and a second node that performs a second, different role will be described here; however, it will be appreciated that embodiments can detect relationships between any number/combination of the nodes.

The step 402 can include detecting similar resource usage by the first node and the second node, and/or detecting resource usage patterns that link the first node and the second node. The step 402 can involve obtaining network nodes property data that describes at least one property (e.g. processor usage, storage usage, etc) of all or some of the network nodes being analysed. This can be used to detect at least one correlation between all or some of the plurality of the network nodes. This information regarding the at least one correlation can be used to identify which of the network nodes implement the logical multi-node application, typically in combination with other information regarding which network nodes implement the logical application/components that is produced by the step 208 and/or the step 210.

For instance, the step 402 may detect similar/matching (e.g. within a predetermined or dynamically-calculated range) usage of processors; similar/matching (e.g. within a predetermined or dynamically-calculated range) amounts of memory usage; similar/matching (e.g. within a predetermined or dynamically-calculated range) amounts of power usage; similar timing of usage of a resource (e.g. starting/stopping use of processors, memory or other resources at the same time; at approximately the same time, such as within a predetermined range, or sequential starting/stopping); similar increases or decreases in processor/memory usage; proportional relationship pattern (e.g. a first node uses X amount of a processor resource at/around the same time that a second node uses Y amount of a processor resource, where X is regularly proportional to Y), etc. As another example, the step 402 may detect that a particular node, node_A, is regularly (e.g. more than once within a 1 hour period) started after (or in response to a load on) another node, node_B, and also detects that the node_A subsequently uses resources in a similar pattern/manner to the node_B. This logic would detect a resource usage pattern that links node_A with node_B. The information analyzed at the step 402 may be mainly provided by the network manager service 144, but in some cases may also, or alternatively, include information from the monitoring service 146 and/or a resource/inventory domain, such as an inventory table of the management server 140.

At step 404 some embodiments can detect at least one correlation between the nodes by detecting similar network data flow at the first node and the second node, such as a similar volume of data being transferred to/from the nodes (at a particular time frame); similar connection frequencies, etc. The information analyzed at the step 404 may be provided by the network manager service 144, e.g. amount of incoming/outgoing traffic (e.g. in bytes) per node or service over a specified time period; netflow patterns such as silence duration between initial/closing and subsequent sized requests (these may be granularized to request-reply); source and destination ports; NAT (Network Address Translation) and routing details.

At step 406 some embodiments can detect at least one correlation between the nodes by detecting similar (or identical) characteristics of log data relating to the first node and the second node, such as similar (e.g. within a dynamic or predetermined range) number of events per second; detecting proportional relationships (e.g. the first node regularly sends 10 times the number of messages than the second node within a certain time frame); volume of logs; log appending frequency, etc. The log data analyzed at the step 406 can be provided by the monitoring service 146, e.g. source IP of a connecting client; login name of a user of the application; name of relevant user-action; result of the action (success, fail, etc).

At step 408 some embodiments can detect exclusiveness of network flow/data transfer patterns between the nodes. This detecting of exclusiveness can include, for example, detecting transfer of an amount of data meeting a predetermined or dynamic threshold between the first node and the second node, and less/no data transfer between the first/second node and any other node. The detecting of exclusiveness can include detecting transfer of data between the first node and the second node at a frequency meeting a predetermined or dynamic threshold, with data transfer between the first/second node and other nodes not meeting the predetermined or dynamic threshold. Examples of data fields analyzed here include an amount of incoming/outgoing traffic (e.g. in bytes) per node or service over a specified time period; netflow patterns such as silence duration between initial/closing and subsequent sized requests (these may be granularized to request-reply); source and destination ports; NAT (Network Address Translation) and routing details.

Figure 5:
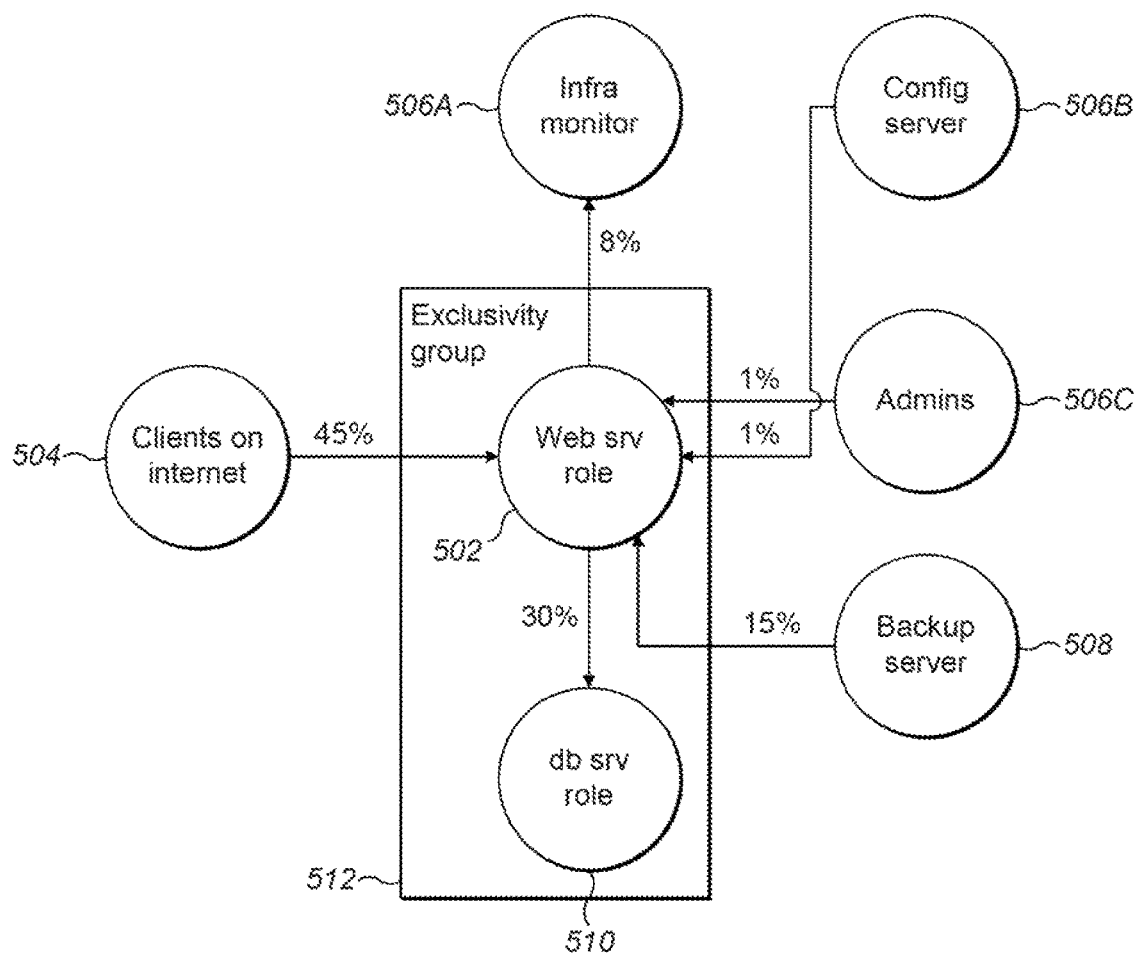
FIG. 5 schematically illustrates using detection of exclusiveness between nodes to detect if a relationship exists between the nodes.

FIG. 5 schematically illustrates an example of using the detection of data flow exclusiveness between nodes to detect if a relationship exists between the nodes. In the example a node 502 has been identified (e.g. by the step 208) as performing a web-server role. The internet client node(s) 504 will normally have been excluded from being possible nodes that implement a logical application by the filtering step 202. The step 408 may also disregard nodes that have a low (e.g. below a predetermined or dynamic threshold) traffic flow to/from a particular node. For example, nodes that constitute less than 10% of the traffic to/from the web-server node 502 are considered non-significant for implementation of the logical application. Thus, in the illustrated example infrastructure monitor node 506A, configuration server node 506B and administrator node 506C are not considered to have an exclusive data flow relationship with the web-server node 502 due to the respective traffic flows being less than 10%.

It will be appreciated that for other types of nodes/roles, different criteria for the detection of an exclusiveness-based relationship may be used.

In some embodiments the step 408 may disregard nodes that comprise shared resources. In the illustrated example, even though the traffic flow between the web-server node 502 and a backup server node 508 is significant (over 10%, at 15%), the volume with respect to the web-server node 502 is not exclusive because no particular web service/logical application has dominant volume within the backup server's traffic (otherwise, if the backup server node 508 was dedicated to the web service provided by the node 502 then its traffic would be mostly directed to/from nodes that implement that web service). Some embodiments may, alternatively or additionally, count a number of relationships detected between a node and other nodes that have already been identified as implementing a particular logical application/components, e.g., based on the network flow exclusivity between the backup server node 508 and all web-servers and database-servers that are components of the logical application.

In the illustrated example, a database server node 510 has a significant (over 10%, at 30%) traffic flow to/from the web server node 502. Also, the database server node 510 does not have (significant) traffic flow with any other node. Thus, the step 408 may determine that there is exclusiveness in the data flow between the web server node 502 and the database server node 510 (denoted by box 512).

At step 410, electronic data representing the relationships between nodes detected by the steps 402-408 is stored for further automatic processing.

Returning to FIG. 2, at step 212 some embodiments can analyze the node roles identified at the step 208 and the relationships between nodes detected at the step 210 in order to identify which of the network nodes implement a logical multi-node application.

Figure 6A:
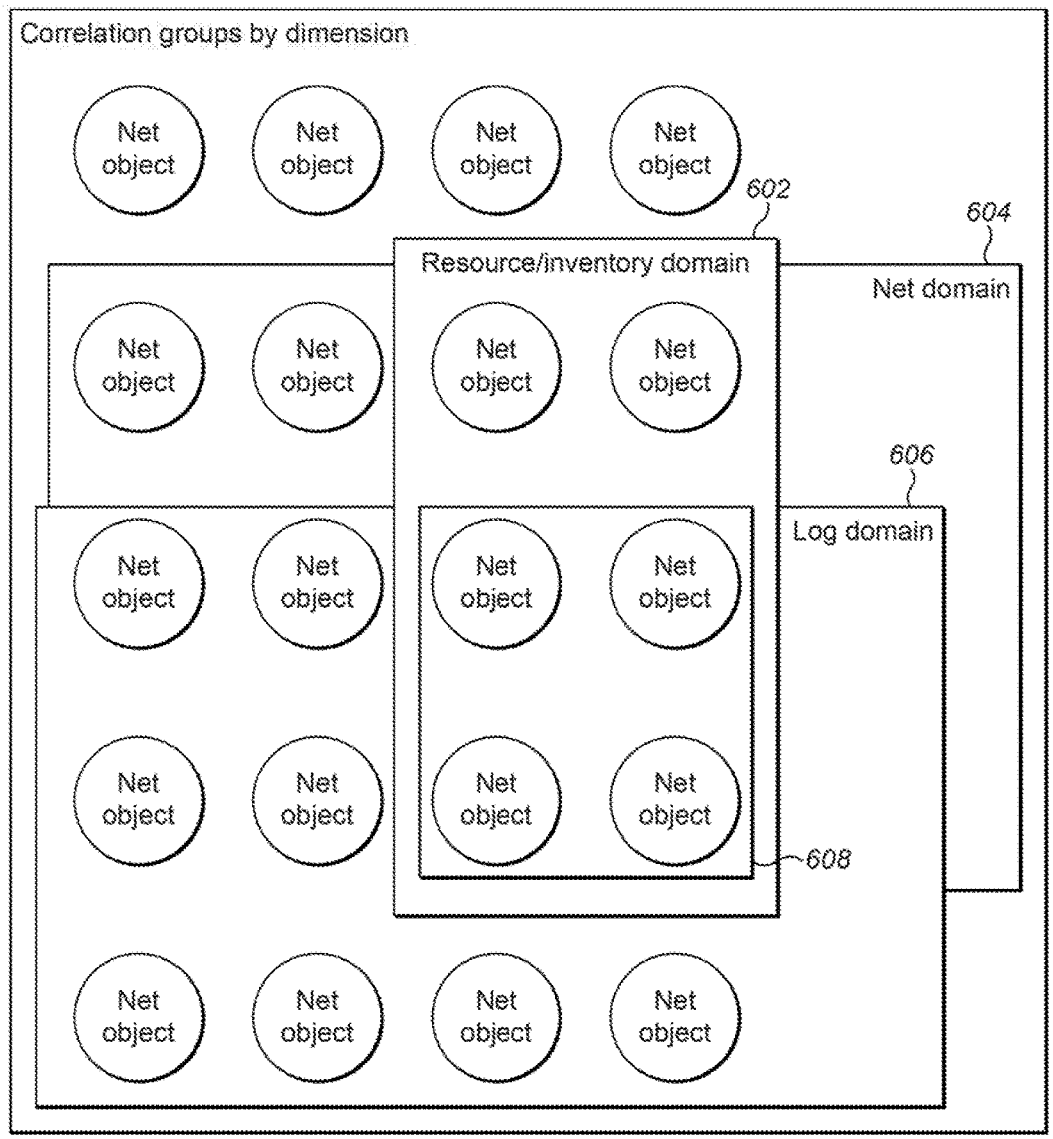
FIG. 6A schematically illustrates examples of identification of correlations between nodes.

FIG. 6A schematically illustrates an example of how the identified roles and the detected relationships can be analyzed to identify which of the nodes implement the logical application. In the example of FIG. 6A a first subset 602 of the nodes being analyzed were grouped together as a result of detecting a relationship based on similar resource usage/patterns by those nodes, e.g. by the step 402. A second subset 604 of the nodes being analyzed were grouped together as a result of detecting a relationship based on the analysis of network data flow between those nodes, e.g. by the step 404. A third subset 606 of the nodes being analyzed were grouped together based on the log data relating to those nodes, e.g. by the step(s) 302, 304 and/or 406. At the step 212 some embodiments can identify the nodes that implement the same logical application as the nodes present in some, and typically all, of the subsets 602, 604 and 606. For example, the nodes that implement the logical application may be identified as the four nodes that are within an intersection 608 of all of the subsets 602, 604 and 606. Basing the identification of nodes on meeting more than one such different criteria can improve the accuracy of the results.

It will be appreciated that the above is merely one example and other embodiments can identify which of the nodes implement a logical application by performing different types of analysis of (any combination of) the information generated by node role identification step 208 and the node relationships detection step 210. Some embodiments may perform two or more iterations of at least some of the steps 202-212 in order to clarify/improve accuracy of the identification of which of the nodes implement a logical application. For example, an embodiment may firstly detect a relationship between the web-server node 502 (of the example of FIG. 5) and the database-server node 510 based on similar characteristics of log data, e.g. at the step 406. Subsequently, upon detecting exclusiveness of network flow between the two nodes, e.g. at a later iteration of the step 408, the membership of the database-server 510 in the same logical application implemented by the web-server 502 can be reinforced by the analysis step 212.

For the avoidance of doubt, it should be noted that some embodiments can perform the node relationship detection step 210 before the node role identification step 208. For example, an embodiment may firstly detect a correlation the web-server node 502 (of the example of FIG. 5) and the database-server node 510 based on similar characteristics of log data, e.g. by the step 406. Subsequent identification of the roles performed by the two nodes based on event types, e.g. at a later execution of the step 304, can reinforce the membership of the database-server 510 in the same logical application implemented by the web-server 502 by the analysis step 212.

Figure 6B:
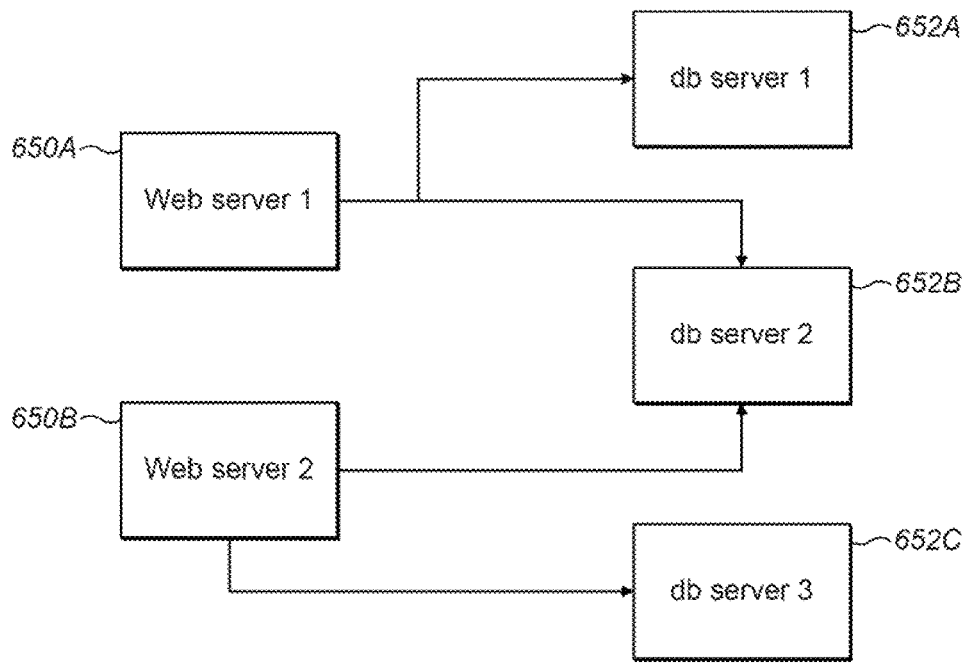
FIG. 6B schematically illustrates identifying which of the nodes implement a logical application based on detecting interaction of nodes that perform the same role.

At the step 212 some embodiments can identify (or further clarify) which of the nodes implement a logical application based on interactions of nodes that perform the same roles. In the example of FIG. 6B, a set 650A, 650B of nodes (web-server1, web-sever2) comprise nodes that have been identified (e.g. at the step 208) as performing the same web-server role, and a set 652A, 652B, 652C of nodes (db-server1, db-server2, db-server3) comprise nodes that have been identified (e.g. at the step 208) as performing the same database-server role. In this example, the network traffic of one of the web-server nodes, web-server1, is distributed (without data flow exclusiveness or a dominant counterpart node) through the database-server nodes db-server1 and db-server2. The network traffic of the other web-server node, web-server2, is distributed (without data flow exclusiveness or a dominant counterpart node) through the database-server nodes db-server2 and db-server3. In this case, the step 212 can determine that due to the mutual data flow to db-server2, the nodes web-server1 and web-server2 are related by association and implement the same logical application.

In general, embodiments may use presence of mutual data transfer between at least one of a first set of nodes that have been identified as performing a same role, and at least one of a second set of nodes that have been identified as performing a same role (but different to the role of the first set) to determine that the nodes in the first set implement the same logical application as the nodes in the second set.

Referring again to FIG. 2, at step 214 some embodiments can identify which of the nodes implement logical components of a particular logical application. A component can comprise a specific instance of a network node that implements a role within a logical multi-node application. Identification of logical components can therefore be based on logical unity of VCIs within the same role. The nodes that implement logical components of a particular logical application will be identified as nodes that (according to the previously-executed steps 202-212) perform the same role within that logical application, e.g. nodes that implement a web-server component of a logical application; nodes that implement a database-server component of the logical application, etc. It should be noted that in some cases, nodes can implement more than one role, and such multiple roles may be part of one or more logical components. For example, a first node, server-1, can perform two roles (such as web-service and db-service), whilst another node, server-2, can perform two roles (such as mail-service and db-service), etc. Some embodiments can identify such multiple service combinations.

At step 216 some embodiments can automatically process implementation data that is based on the identification of the nodes that implement a logical application (and, in some cases, the nodes that implement the components), which can be generated and stored following the step 212 and/or the step 214. The processing of the implementation data can be done for various purposes, such as automatically controlling management of the nodes or the multi-node networked application(s). Some embodiments can use the implementation data to treat the nodes that implement the logical application/component (and/or related nodes) as a manageable entity and perform administrative operations on that manageable entity. The implementation data can take various forms, e.g., a simple list/table of the nodes that have been identified as implementing a particular logical application and/or components, or more complex data structures that can include additional information. The implementation data may be processed by the same computing device(s), or VM(s), that generated it, or by any other computing device(s), or VM(s), that can access it.

Some embodiments may use the implementation data to dynamically alter/control the scope of technical management operations, including monitoring, of network nodes. For example, if a problem is detected in relation to a particular logical application (or at least one component of the logical application) then a monitoring service may receive substantially real-time implementation data describing which network nodes implement the logical application (or component(s)) and then automatically focus its monitoring on all (or one or more selected ones) of those relevant nodes. This can allow an administrator to more quickly and conveniently analyze/solve the problem than by having to monitor a (possibly very large) set of nodes that are not actually involved with the logical application.

In another example, the implementation data may be used to automatically and dynamically modify/control a network node management operation, such as more efficient workload placement to maximize resource usage and self-containment of virtualization hosts; smarter routing focusing on shortest paths between servers that perform different roles; harmonious and differential migration of nodes to minimize logical application downtime or expenses/performance impact. For example, if a problem is detected where at least one node that implements a logical application is faulty and results in failure to meet a Service Level Agreement (SLA) then the management service can receive implementation data describing which network nodes implement the logical application in order to automatically re-route net traffic to healthy nodes or efficiently move the relevant node(s) to a healthy environment. In alternative cases, the faulty node may be cloned, or a dormant node of same role may be raised. Other examples of management operations that can be automatically modified/controlled using the implementation data include more efficient backup of multitude of nodes implementing same role; deduplication of monitoring data (e.g. keeping minimal dominant normalcy patterned data from multitude of nodes implementing same role within the logical application); scaling of the monitoring infrastructure in sync with the monitored logical application; enhanced intrusion detection/prevention systems addressing inherent shortcomings with better and structured visibility from monitoring. Thus, embodiments can provide "zero-touch" solutions that automatically recognize which network nodes are responsible for implementing a logical application (and its components) without requiring detailed or time-consuming analysis by a human administrator.

Some embodiments may use the information to identify changes which are abnormal from a logical application's perspective (or in general) and break them down further to the level of the application's components for better management. The changes may be in various domains/dimensions, e.g., network, resources, etc. The following example is based on network changes. Network characteristic changes can have a negative impact on networked logical applications, even when these changes are within normalcy limits from a network perspective. Examples include network Maximum Transmission Unit (MTU) size or latency between critical nodes (such as a web-server and streaming-video-server within a logical application), or automatic self-throttling of the application due to saturation of available net bandwidth for cluster leader node. Existing network-node/VM-level monitoring does not show the bigger picture of the structure of a logical application and its components, or the interactions required for smarter management and automation. Some embodiments can identify network changes which are abnormal from the perspective of a specific logical application and break them down further to the level of the application's components for better management.

Figure 7:
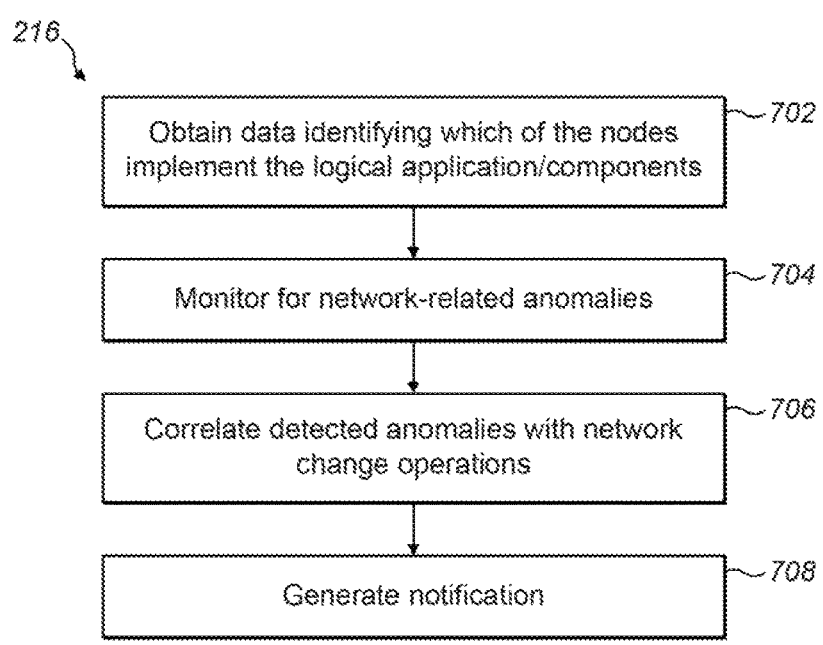
FIG. 7 is a flowchart illustrating operations that can be performed at an abnormal network changes identification step of the example embodiment.

FIG. 7 schematically illustrates operations that can be performed by some embodiments at the step 216 in order to identify network changes which are abnormal.

At step 702, some embodiments can obtain data identifying which of the nodes implement logical applications and/or the components of a logical application (as generated by the step 212 and/or the step 214).

At step 704, some embodiments can monitor for network-related anomalies for each logical application. This monitoring can have different scopes, e.g. from inter-node to application-boundary. The monitoring can use data received from various sources, examples of which can include one or more of the following:

1. Logs (e.g. from the monitoring service 146) and log-based alerts (for user-defined anomalies) indicating the network as the cause. This can extend beyond simple log messages to abnormal event_types determined in embodiments where the monitoring service 146 comprises VMware Log Insight, such as new or outlier event_types.

2. Indicators (e.g. provided by VMware vRealize Operations) or indicator-based alerts, where a previous change was network-based or an added resource stress did not negatively affect other types (e.g. CPU, RAM, storage).

3. The network manager service 144.

At step 706 some embodiments can correlate any anomaly detected by the monitoring step 704 with relevant network change operations. For example, network changes that occurred within a specific time range; network changes that impact the nodes that implement relevant logical application component, etc.

Examples of anomalies that can be detected by some embodiments include: an administrator changing network MTU size; logs indicating application errors between webserver and streaming-video-server types of a logical application's component nodes (using types instead of specific nodes can additionally help to solve issues before impacting other nodes of the specific type which have not generated errors, e.g. due to not being used/strained yet, etc); indicators that show, e.g. a CPU spike afterwards. Embodiments can correlate anomalies such as these and, at step 708, generate a notification to an administrator regarding aggregated auto-Root Cause Analysis about network MTU change impact on a logical application's relevant component node-types (as opposed to a more conventional notification simply about specific VM CPU spikes or node-originated log errors).

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, it will be understood that that the invention can be embodied in other specific forms without departing from the spirit of the invention. For instance, this specification refers throughout to computational and network environments that include virtual machines (VMs). However, virtual machines are merely one example of data compute nodes (DCNs). DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. Whilst the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 2, 3 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, it will be appreciated that the invention is not to be limited by the foregoing illustrative details, but rather is to be defined by the appended claims.

What is claimed is:

1. A method of managing network nodes that implement a logical multi-node application, the method comprising:
    detecting a problem in relation to the logical multi-node application;
    obtaining log data describing events relating to a plurality of network nodes;
    obtaining network flow data describing flow of data between the plurality of network nodes;
    obtaining resource usage and resource patterns by the plurality of network nodes;
    identifying a first subset of the plurality of network nodes as having a first relationship based on the log;
    identifying a second subset of the plurality of network nodes as having a second relationship based on the network flow data;
    identifying a third subset of the plurality of network nodes as having a third relationship based on the resource usage and resource patterns;
    comparing the first subset, the second subset, and the third subset of the plurality of network nodes;
    based on the comparing, detecting at least one correlation between one or more nodes;

analyzing the at least one correlation to identify which of the plurality of network nodes implement a logical multi-node application; and processing implementation data based on the identification of which of the plurality of network nodes implement the logical multi-node application to alter management of at least one of the network nodes that implement the logical multi-node application to address the detected problem in relation to the logical multi-node application.

2. The method according to claim 1, wherein the analyzing the log data comprises:

grouping identical or similar said events relating to different ones of the plurality of network nodes into event types, wherein said similar events comprise said events from said log data having identical static parts, and wherein a said role comprises a distinct set of the event types.

3. The method according to claim 1, wherein altering the management of the at least one of the network nodes comprises controlling the management of the at least one of the network nodes separately from other nodes.

4. The method according to claim 1, further comprising:

obtaining network nodes property data describing at least one property of a plurality of the network nodes;

analyzing the network nodes property data to detect at least one correlation between the at least one property of the plurality of network nodes; and analyzing the at least one detected correlation to identify which of the network nodes implement the logical multi-node application.

5. The method according to claim 4, wherein the at least one property comprises one or more of network usage and resource usage.

6. The method according to claim 5, wherein detecting the at least one correlation between one or more nodes comprises detecting substantially matching usage amounts of the resource by a first network node and a second network node within a time frame.

7. The method according to claim 5, detecting at least one correlation between one or more nodes comprises detecting usage amounts of the resource by a first network node and a second network node, the usage amounts having a proportional relationship.

8. The method according to claim 4, wherein detecting the at least one correlation comprises detecting identical or similar log data relating to a first network node and a second network node.

9. The method according to claim 1, wherein the analyzing the network flow data comprises analyzing data transfer between a first network node and a second network node to detect an identical or similar volume of data being transferred by the first network node and the second network node within a time frame, and/or detecting an identical or similar connection frequency by the first network node and the second network node within a time frame.

10. The method according to claim 1, wherein the analyzing the network flow data comprises detecting exclusiveness of data flow between a first network node and a second network node.

11. The method according to claim 10, wherein the detecting exclusiveness of data flow comprises:

detecting transfer of an amount of data that exceeds a threshold between the first network node and the second network node;

not detecting transfer of an amount of data that exceeds the threshold between the first network node and any other network node; and not detecting transfer of an amount of data that exceeds the threshold between the second network node and any other network node.

12. The method according to claim 10, further comprising excluding any said network node that functions as a shared resource for said network nodes other than the first network node and the second network node from the detecting exclusiveness of data flow.

13. The method according to claim 1, wherein the analyzing the network flow data comprises:

detecting a plurality of correlations between a plurality of properties of said network nodes, and wherein the analyzing to identify which of the network nodes implement the logical multi-node application comprises identifying the network nodes that comprise at least two of the plurality of correlations.

14. The method according to claim 1, wherein the analyzing the at least one correlation to identify which of the plurality network nodes implement the logical multi-node application comprises:

detecting interactions between at least one network node of the first subset of the plurality of network nodes and at least one network node of the second subset of the plurality of network nodes, and at least one network node of the third subset of the plurality of the network nodes, and identifying each of the at least one network nodes as the nodes that implement the logical multi-node application based on the detected interactions.

15. The method according to claim 1, further comprising:

identifying which of the plurality of network nodes implement logical components of the logical multi-node application as the network nodes identified as performing a same said role within the logical multi-node application.

16. The method according to claim 1, further comprising:

obtaining data relating to the nodes identified as implementing the logical multi-node application, and analyzing the obtained data to detect at least one anomaly relating to the logical multi-node application.

17. The method according to claim 1, wherein addressing the detected problem in relation to the logical multi-node application comprises:

determining that a node identified as implementing the logical multi-node is faulty; and re-rout network traffic away from the faulty node.

18. The method according to claim 1, wherein the logical multi-node application provides one or more of the following services using two or more network nodes: web applications, back office, document management, and communications.

19. A non-transitory machine readable medium storing a program which when executed by at least one processing unit manages network nodes that implement a logical multi-node application, the program comprising sets of instructions for:

detecting a problem in relation to the logical multi-node application;

obtaining log data describing events relating to a plurality of network nodes;

obtaining network flow data describing flow of data between the plurality of network nodes;

obtaining resource usage and resource patterns by the plurality of network nodes;

identifying a first subset of the plurality of network nodes as having a first relationship based on the log;

identifying a second subset of the plurality of network nodes as having a second relationship based on the network flow data;

identifying a third subset of the plurality of network nodes as having a third relationship based on the resource usage and resource patterns;

comparing the first subset, the second subset, and the third subset of the plurality of network nodes;

based on the comparing, detecting at least one correlation between one or more nodes;

analyzing the at least one correlation to identify which of the plurality of network nodes implement a logical multi-node application; and processing implementation data based on the identification of which of the plurality of network nodes implement the logical multi-node application to alter management of at least one of the network nodes that implement the logical multi-node application to address the detected problem in relation to the logical multi-node application.

20. A system configured to manage network nodes that implement a logical multi-node application, the system comprising one or more processing units executing sets of instructions for:

detecting a problem in relation to the logical multi-node application;

obtaining log data describing events relating to a plurality of network nodes;

obtaining network flow data describing flow of data between the plurality of network nodes;

obtaining resource usage and resource patterns by the plurality of network nodes;

identifying a first subset of the plurality of network nodes as having a first relationship based on the log;

identifying a second subset of the plurality of network nodes as having a second relationship based on the network flow data;

identifying a third subset of the plurality of network nodes as having a third relationship based on the resource usage and resource patterns;

comparing the first subset, the second subset, and the third subset of the plurality of network nodes;

based on the comparing, detecting at least one correlation between one or more nodes;

analyzing the at least one correlation to identify which of the plurality of network nodes implement a logical multi-node application; and processing implementation data based on the identification of which of the plurality of network nodes implement the logical multi-node application to alter management of at least one of the network nodes that implement the logical multi-node application to address the detected problem in relation to the logical multi-node application.

* * * * *

UNITED STATES PATENT AND TRADEMARK OFFICE
CERTIFICATE OF CORRECTION

PATENT NO. : 10,462,030 B2
APPLICATION NO. : 15/287799
DATED : October 29, 2019
INVENTOR(S) : Vardan Movsisyan Page 1 of 1

It is certified that error appears in the above-identified patent and that said Letters Patent is hereby corrected as shown below:

On the Title Page

Item (73), should read --NICIRA, INC., Palo Alto, CA (US)--

Signed and Sealed this
Twenty-fourth Day of November, 2020

Andrei Iancu
*Director of the United States Patent and Trademark Office*